Aug. 16, 1960  C. L. D'OOGE  2,949,009
VARIABLE THRUST SOLID PROPELLANT ROCKET MOTOR
Filed April 20, 1959
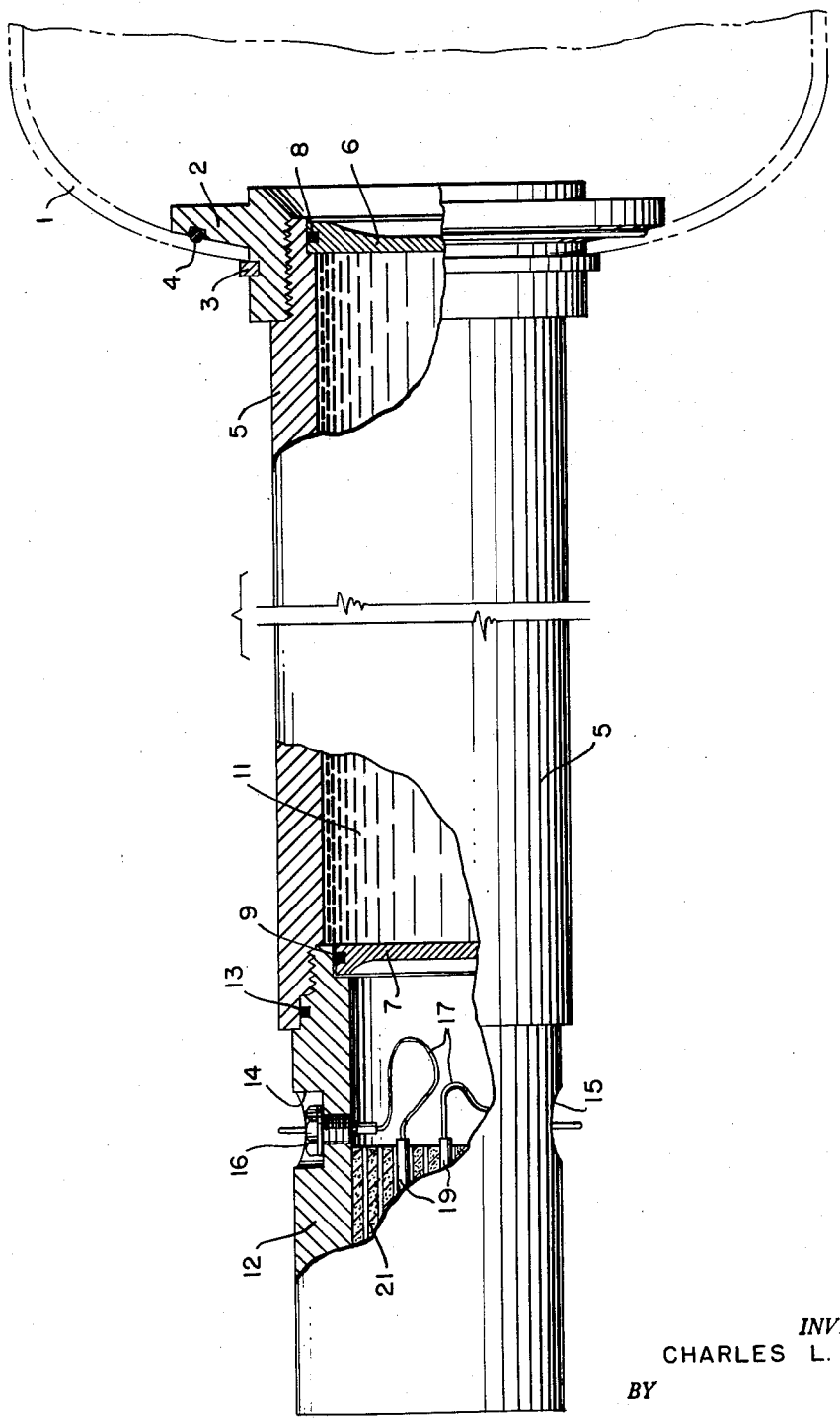
INVENTOR.
CHARLES L. D'OOGE
BY
KF Ross
ATTORNEYS.

United States Patent Office 2,949,009
Patented Aug. 16, 1960

2,949,009

VARIABLE THRUST SOLID PROPELLANT ROCKET MOTOR

Charles L. D'Ooge, Citrus Heights, Calif., assignor to the United States of America as represented by the Secretary of the Navy Filed Apr. 20, 1959, Ser. No. 807,738

1 Claim. (Cl. 60—35.6)

(Granted under Title 35, U.S. Code (1952), sec. 266)

The invention herein described may be manufactured and used by or for the Government of the United States of America for governmental purposes without the payment of any royalties thereon or therefor.

This invention relates to the control of thrust generated by rocket engines; more specifically it relates to controllable termination of thrust generated by solid propellant engines.

The control of thrust magnitude in rocket engines is usually accomplished by controlling the burning rate of the propellants employed, and thrust cancellation has been accomplished in some instances by reversing the direction of the thrust. In liquid propellant engines, thrust control is achieved by the manipulation of fuel and oxidizer metering valves.

With conventional solid propellant engines however, the propellant carries its own oxidizer and will burn to completion at a substantially constant rate, once ignited. Thus the burning pattern and consequently the trust-time pattern of the engine must be worked out in advance, for once the rocket is underway, the thrust cannot be manipulated to compensate for errors in trajectory.

Efforts to control the thrust of solid propellant rockets in flight have led to the control of the pressure in the combustion chamber by enlarging the main nozzle throat area or by opening other nozzles. Such methods however require high temperature, high pressure seals between the metal parts and produce high peak thrusts which can result in serious damage to guidance components. Not unlikely is the production of asymmetric thrust loads sufficient to deflect the missile from its course.

In static testing, also, it is often desirable to terminate the burning of the grain and preserve the unburnt portion for the study of erosion and burning patterns. For rocket engine storage purposes, also, it is desirable to have means to extinguish any grains which might accidently ignite. Accordingly, external deluge apparatus has been used in the past wherein water under high pressure is forced from nozzles into the nozzle end of the rocket combustion chamber. Such apparatus is bulky and cumbersome however.

It is therefore an object of this invention to provide a controllable thrust rocket engine which eliminates the use of high temperature, high pressure seals.

Another object is to provide an engine of the aforementioned type in which peak thrusts are eliminated.

Still another object is to provide an engine of the aforementioned type in which no asymmetric thrust loads are produced.

A final object is to provide a compact apparatus for terminating burning of solid propellant rocket grains.

Other objects and advantages of the invention will hereinafter become more fully apparent from the following description of the annexed drawing which shows a plan view, partly in section, of the apparatus.

Referring now to the drawing of the preferred embodiment, there is shown a motor casing 1 having an aperture in the head thereof, an adaptor 2 consisting of a cylinder flanged at one end, the cylindrical part being positioned in the aperture so that the flange abuts the inner face of the motor casing. The adaptor 2 is held in the described position by locking ring 3 which is positioned in an annular groove in the cylindrical portion of the adaptor and which abuts the outer face of the casing. A seal is formed between the inner face of the casing and the flange by O ring 4.

The cylindrical portion of the adaptor is threaded internally at the end opposite to the flange and countersunk at the flanged end. A cylindrical container 5 is provided with external threads at one end and is attached to the adaptor 2 by engagement of the threads. Container 5 is further provided with a sealing disk 6 at the motor end; O ring 8 acts as a seal between container 5 and the motor casing. Disk 7 forms a closure for container 5 at the opposite end to contain water 11 and fits in a recess in container 12 which is attached to container 5. O ring 9 forms a seal between the two containers.

Container 5 is threaded internally at the end opposite to the end nearest the motor casing to engage external threads on container 12 thus attaching container 12 to container 5, and O ring 13 forms a seal between container 5 and the outside.

Container 12 is provided with recesses 14 and 15 in the walls at right angles to its axis, and each recess has a threaded aperture extending from the bottom of the recess through the wall of the container. Each recess accommodates a lead-in plug 16 (one hidden from view) having a hexagonal head and provided with external threads which engage the threads of the aperture. Plugs 16 may be of conventional type, fitted with an electrical feed-through element insulated from the plug body and having a pin terminal projecting beyond the hexagonal head. Bridge wires 17 are flexibly connected between plugs 16 and squibs 19 which are positioned in perforations of multiperforated gas generator grain 21.

The containers 5 and 12, as well as the adaptor 2, are made of metal, preferably aluminum, and are designed to be rigid. Disks 6 and 7 are made of a softer, more flexible metal, or of plastic. The O rings are conventional plastic material. The gas generator grain composition may be any known in the art, depending upon the burning rate desired. The electric squibs and the provisions for actuating them are also conventional and well known in the art.

It is obvious that the gas generator grain may have any geometry, which when taken with the burning rate of the grain, greatly affects the rate of pressurization of container 12. The number of squibs employed also affects the aforesaid rate of pressurization and is also a matter of the designer's choice.

Container 5 may be made in varying lengths, depending upon the amount of water desired. No more than the amount required to completely quench burning in a particular rocket is desirable, but lesser amounts of water which do not completely quench, but only reduce burning are sometimes desirable. The container may have a multiplicity of flexibly sealed openings leading into the motor, if desired.

The length of container 12 is not critical and may vary considerably, depending upon the volume occupied by the gas generator grain and the volume of empty space desired in said container.

Disks 6 and 7 may be made any thickness depending upon the rupture point desired.

The whole assembly may be scaled up or down to be sutiable for use with any size motor, or depending upon the distribution of water desired.

In operation, in response to an external signal, for instance from a heat sensing element or a timer, the circuit to the squibs is closed, resulting in ignition of the grain by the squibs. The pressure inside container 12 builds up rapidly and exerts a force on disk 7. The disk is flexible and transmits the pressure to disk 6 through the water 11. The hydrostatic pressure exerted on disk 6 from one direction is opposed by pressure from the burning propellant grain which is inside the motor casing 1. When the hydrostatic pressure exceeds the gas pressure in the motor by a determined amount, disk 6 will rupture, and water 11 bursts into the motor where it cools the burning propellant grain causing the motor pressure to drop, resulting in burning being inhibited or stopped.

Obviously many modifications and variations of the present invention are possible in the light of the above teachings. It is therefore to be understood, that within the scope of the appended claim, the invention may be practiced otherwise than as specifically described.

What is claimed is:

In combination: a solid propellant rocket motor having a casing in which are defined a longitudinal axis and a casing head; an adaptor member secured to said casing head and having a cylindrical passageway extending through said casing head and substantially in alignment with said axis; a quenching structure of generally cylindrical configuration, directly and threadedly engaged at one end with said adaptor member, extending away from said casing in alignment with said axis, and having a pressurizing section at the other end thereof; said pressurizing section containing a multi-perforated gas-generator grain and a multiplicity of electrical squibs distributed therein, for extremely rapid development of pressure when a squib-firing voltage is applied, and said pressurizing section having external terminals leading to said squibs; said quenching structure having a cylindrical bore therein extending from said pressurizing section along said axis and through said adaptor member into unrestricted direct communication with said casing; a pair of pressure-rupturable sealing disks closing off said cylindrical bore at said pressurizing section and at said adaptor member and defining therebetween a sealed container; and a quenching liquid stored in said sealed container; whereby to provide a burst of quenching liquid into said rocket motor casing and correspondingly terminate rocket motor thrust upon application of a firing voltage to said terminals.

References Cited in the file of this patent

UNITED STATES PATENTS

| | | |
|---|---|---|
| 2,671,312 | Roy | Mar. 9, 1954 |
| 2,841,953 | Teague | July 8, 1958 |
| 2,848,872 | Proell et al. | Aug. 26, 1958 |
| 2,880,582 | Turansky et al. | Apr. 7, 1959 |

FOREIGN PATENTS

| | | |
|---|---|---|
| 723,040 | Great Britain | Feb. 2, 1955 |